United States Patent
McDowell

(10) Patent No.: US 7,793,953 B2
(45) Date of Patent: Sep. 14, 2010

(54) STEERING KNUCKLE BOOT

(75) Inventor: Robert McDowell, Branson, MO (US)

(73) Assignee: Ride the Ducks International, LLC, Branson, MO (US)

( * ) Notice: Subject to any disclaimer, the term of this patent is extended or adjusted under 35 U.S.C. 154(b) by 665 days.

(21) Appl. No.: 11/464,707

(22) Filed: Aug. 15, 2006

(65) Prior Publication Data
US 2008/0042388 A1 Feb. 21, 2008

(51) Int. Cl.
*B62D 7/16* (2006.01)
*B60F 3/00* (2006.01)

(52) U.S. Cl. .............. 280/93.512; 280/89.12; 446/133; 446/140

(58) Field of Classification Search ......... 280/89.1, 280/89.12, 93.502, 93.51, 93.512; 440/12.5
See application file for complete search history.

(56) References Cited

U.S. PATENT DOCUMENTS

| | | | | |
|---|---|---|---|---|
| 4,177,654 A | * | 12/1979 | Aucktor | 464/140 |
| 4,210,002 A | * | 7/1980 | Dore | 464/175 |
| 4,460,058 A | * | 7/1984 | Welschof et al. | 180/258 |
| 4,476,950 A | * | 10/1984 | Welschof | 180/384 |
| 4,558,869 A | * | 12/1985 | Grove et al. | 277/315 |
| 4,995,850 A | * | 2/1991 | van der Drift et al. | 464/143 |
| 5,026,323 A | * | 6/1991 | Fukumura et al. | 464/175 |
| 5,052,979 A | * | 10/1991 | Welschof et al. | 464/140 |
| 5,145,191 A | * | 9/1992 | Stewart et al. | 277/636 |
| 5,611,733 A | * | 3/1997 | Jacob et al. | 464/140 |
| 5,624,318 A | * | 4/1997 | Jacob et al. | 464/140 |
| 5,632,683 A | * | 5/1997 | Fukumura et al. | 464/144 |
| 5,687,669 A | * | 11/1997 | Engler | 440/12.52 |
| 5,931,738 A | * | 8/1999 | Robb | 464/140 |
| 6,152,527 A | | 11/2000 | McDowell | |
| 6,254,487 B1 | * | 7/2001 | Jacob | 464/167 |
| 6,280,266 B1 | | 8/2001 | Sandgren et al. | |
| 6,390,928 B1 | * | 5/2002 | Welschof et al. | 464/140 |
| 6,575,796 B1 | | 6/2003 | McDowell | |
| 6,764,243 B1 | * | 7/2004 | Inuzuka et al. | 403/50 |
| 7,311,167 B2 | * | 12/2007 | Takayanagi et al. | 180/215 |
| 7,316,594 B2 | * | 1/2008 | Longdill et al. | 440/12.5 |
| 7,322,864 B2 | * | 1/2008 | Longdill et al. | 440/12.54 |
| 7,347,785 B2 | * | 3/2008 | Worman et al. | 464/143 |
| 7,435,182 B2 | * | 10/2008 | Ichikawa et al. | 464/179 |
| 2006/0199449 A1 | * | 9/2006 | Longdill et al. | 440/12.5 |
| 2008/0045092 A1 | * | 2/2008 | Roycroft | 440/12.5 |

* cited by examiner

*Primary Examiner*—Toan C To
(74) *Attorney, Agent, or Firm*—H. Frederick Rusche; Husch Blackwell Sanders LLP

(57) ABSTRACT

A boot for covering a steering knuckle of an amphibious vehicle comprising a flexible tube having a first end and a second end, wherein the first end comprises a molded groove for seating a first clamp, and wherein the second end comprises a straight cuff for clamping with a second clamp onto a flange of the steering mechanism of the amphibious vehicle.

21 Claims, 4 Drawing Sheets

STEERING KNUCKLE BOOT

CROSS-REFERENCE TO RELATED APPLICATIONS

None.

BACKGROUND OF THE INVENTION

1. Field of the Invention

The present invention relates to amphibious vehicles, in particular to a boot for protecting parts of the steering mechanism from water.

2. Related Art

Amphibious vehicles, due to being intermittently submerged in water, present special mechanical challenges not encountered with most other vehicles. Many mechanical parts on the underside of an amphibious vehicle are not only exposed to water and other elements under normal road conditions as in terrestrial vehicles, but are completely under water at various points during normal usage. As a result, solutions for protecting moving parts from water penetration on conventional vehicles often prove inadequate for amphibious vehicles.

One such moving part that can be susceptible to water infiltration and damage in amphibious vehicles is the steering knuckle. To permit the front wheels to be driven by a drive shaft while also being pivotable relative to the central portion of the axle, an attachment system is present which transmits force to the wheels in a manner that still allows the ends of the axle to pivot. This attachment system, referred to as a steering knuckle, is part of an oil-containing compartment.

When an amphibious vehicle is operated in water, the front wheels including the steering knuckles are completely submerged. Hydrostatic pressure from the water can lead to the failure of the sealing mechanisms on the knuckles, thereby allowing water to penetrate the gear compartment and also allowing oil to leak out, both of which are undesirable consequences. The area of the steering knuckle that is most at risk for leakage is where the knuckle meets the vehicle axle, which is where movement of the knuckle relative to the axle occurs and thus is where water is most likely to penetrate. When this happens the steering knuckles must be disassembled and rebuilt in order to repair the seals and the gear oil must be replaced. Doing this requires taking the amphibious vehicle out of use for a period of time, also an undesirable consequence.

Many amphibious vehicles that were built long ago for military use are still in service for civilian purposes. Many retrofitted improvements to the original design are added to the vehicles to improve the vehicles' safety and performance, which is important in light of the heavy use the vehicles receive.

What is needed is a way to make water-tight those moving parts of amphibious vehicles that are exposed to water, while still permitting the parts to move and function in a normal manner. This solution must permit access to the parts for routine inspection and servicing. Finally, this solution must be durable and resistant to degradation so as to last for an extended period without needing to be replaced, and it must be resistant to both water and petroleum products.

SUMMARY OF THE INVENTION

In one embodiment the invention is a boot for covering a steering knuckle of an amphibious vehicle comprising a flexible tube having a first end and a second end, wherein the first end comprises a molded groove for seating a first clamp, and wherein the second end comprises a straight cuff for clamping with a second clamp onto a flange of the steering mechanism of the amphibious vehicle.

In another embodiment the invention is a method of retrofitting a steering knuckle of an amphibious vehicle to make the knuckle and axle assembly water-tight, comprising providing a neoprene rubber boot having a first end and a second end; attaching a flange to an axle of the amphibious vehicle; clamping the first end of the boot to the flange; clamping the second end of the boot to a housing of the steering knuckle; and pressurizing the boot and axle with air when the axle is submerged in water.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A steering knuckle boot 20 (FIG. 1) comprises an approximately cylindrical tube or sleeve designed to attach in a water-tight manner to a steering knuckle 21 or other moving part of a vehicle axle 50 while still permitting movement thereof. Boot 20 is preferably made of neoprene rubber, preferably of a type which in addition to being watertight is resistant to ozone and petroleum-based products while remaining flexible and resistant to punctures and tears.

Figure 2A:
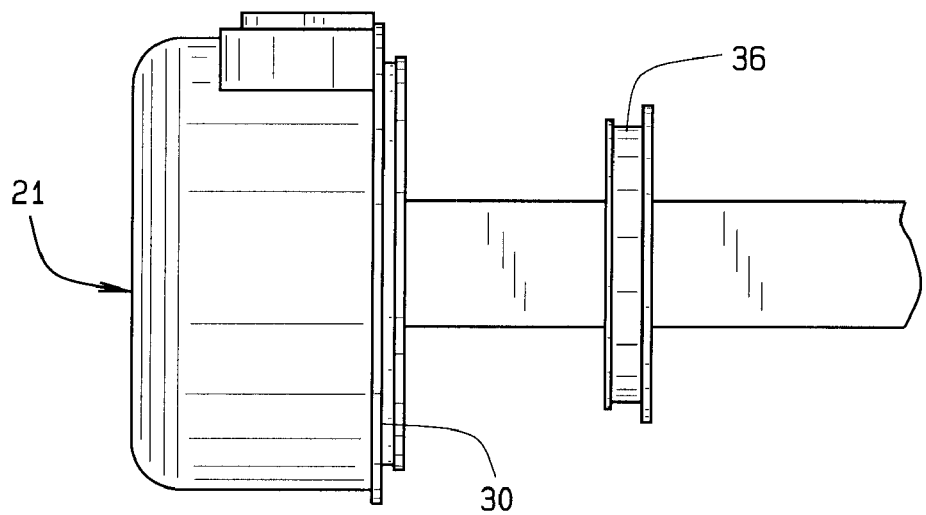
FIG. 2A shows a vehicle axle in which the boot is removed to reveal the steering knuckle and flange/ring assembly.
Figure 2B:
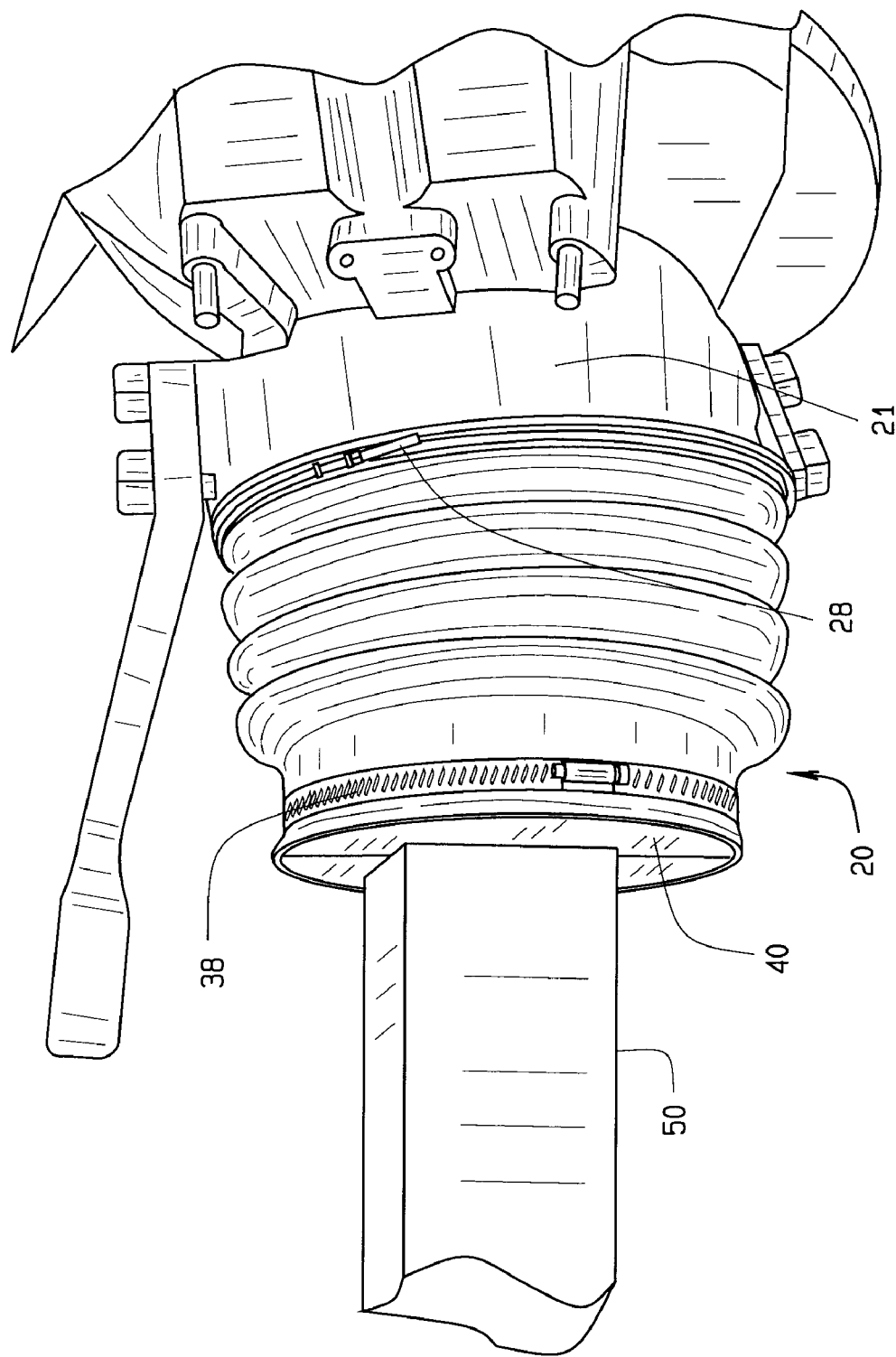
FIG. 2B shows an embodiment of a steering knuckle boot attached to the axle and steering knuckle of an amphibious vehicle.

In order to have a wider range of flexibility the boot preferably is pleated, with a plurality of rounded pleats 22 or folds encircling the tube. In use only the ends of the tube of boot 20 are attached to the steering mechanism, while the central portion is free to expand and contract as the steering mechanism is moved (FIG. 2B).

Figure 1:
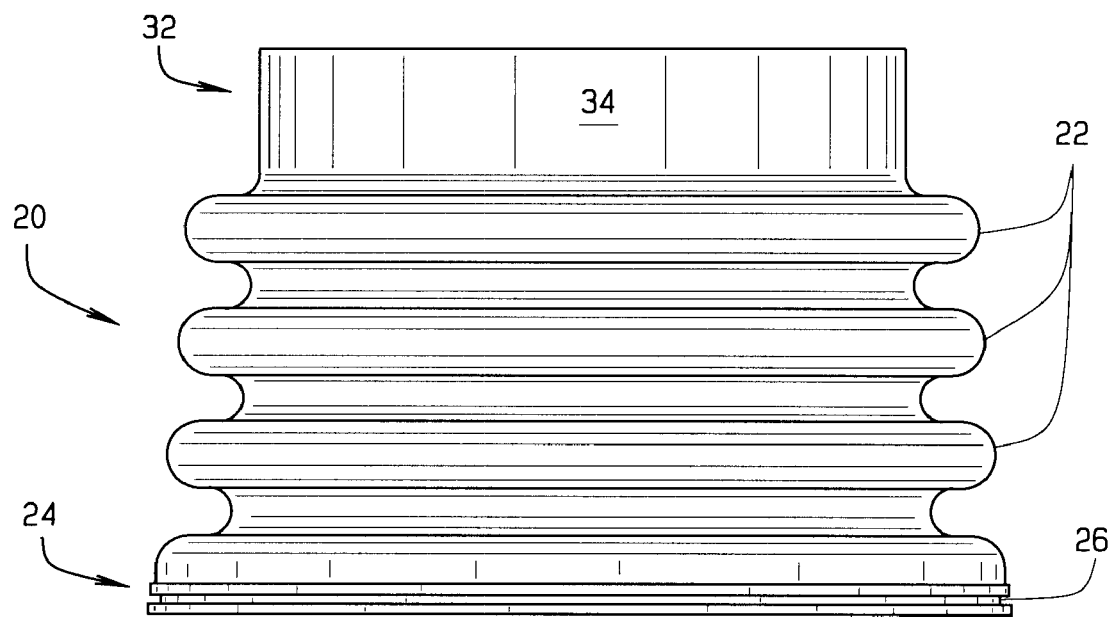
FIG. 1 shows one embodiment of a steering knuckle boot.

In one embodiment, at a first end 24 of boot 20 the tube ends in a molded groove 26 (FIG. 1). Groove 26 is sized to accommodate a first clamp 28. In a preferred embodiment first clamp 28 is a wire clamp having a generally circular cross section, although it is anticipated that other types of clamps will also work. In those embodiments where a different type of clamp is used, groove 26 is preferably molded into a profile that is complementary to that of the clamp. First end 24 of boot 20 preferably fits over a circumferential ridge 30 on the housing of steering knuckle 21 (FIG. 2A). Upon fitting of first end 24 over ridge 30, first clamp 28 is tightened so as to produce a watertight fitting. In a preferred embodiment, groove 26 on first end 24 of boot 20 is complementary to ridge 30 on the housing of steering knuckle 21 in order to optimize the fit between the respective components.

In another embodiment, at a second end 32 boot 20 ends in a flat cuff 34 that is parallel to the central axis of boot 20. Cuff 34 fits on top of a flange 36 attached to vehicle axle 50 by a ring 40. Flange 36 is part of ring 40, where ring 40 is attached to vehicle axle 50 in a water- and air-tight manner, which in one embodiment is by welding. Cuff 34 is held on to flange 36 by a second clamp 38, which in a preferred embodiment is a flat type of clamp such as a hose clamp (FIG. 2B). After sliding second end 32 onto flange 36, second clamp 38 is made sufficiently tight so as to produce a watertight fitting. When both first end 24 and second end 32 of boot 20 are fitted tightly, it is expected that steering knuckle 21 is completely sealed off from water and other external elements through the combined effect of the housing of steering knuckle 21 and boot 20 attached tightly thereto.

Figure 3:
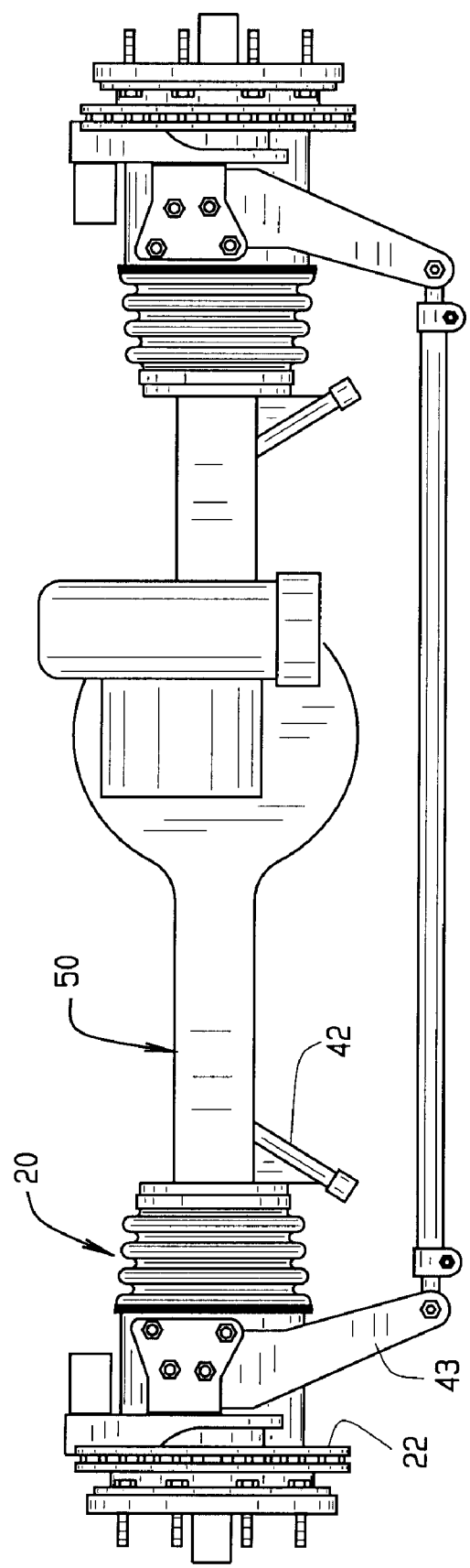
FIG. 3 shows an axle of an amphibious vehicle that has been retrofitted for use with a steering knuckle boot.

To prevent the steering mechanism from pushing against boot 20, in one embodiment a steering stop 42 is attached to vehicle axle 50 as well (FIG. 3). In another embodiment, steering stop 42 is attached to ring 40 and/or flange 36. Steering stop 42 prevents an arm 43 of the steering mechanism from moving too far during a steering maneuver, which if left unchecked could damage boot 20.

Figure 4:
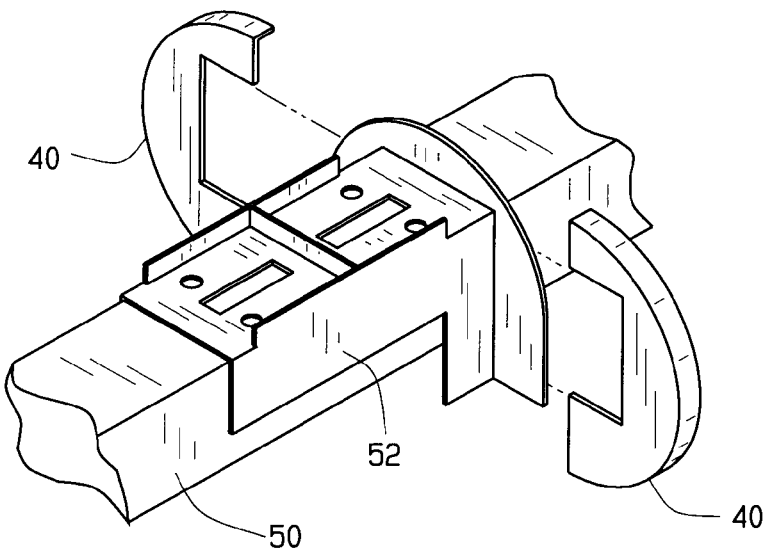
FIG. 4 shows a portion of a vehicle axle on which a jig is attached in order to hold the two halves of a flange and ring assembly during attachment to the axle.

In order to achieve the water-tight attachment of boot 20 as described above on existing amphibious vehicles, certain retrofitting steps must be taken (FIG. 3). As mentioned above, ring 40 and flange 36 must be welded to vehicle axle 50 in order to permit tight attachment of flat cuff 34. In order to fit ring 40 around axle 50, ring 40 is preferably made as two complementary pieces that together surround axle 50. To facilitate attachment of the pieces of ring 40 onto axle 50, in one embodiment a jig 52 is used to hold the pieces in place during assembly (FIG. 4). Jig 52 in one embodiment has a hollow square shaft to rest on an axle with a square cross-section, with a flat end having a curved profile matching that of the lip of ring 40. After firmly attaching jig 52 to axle 50, ring 40 is then attached (e.g. by clamping) to jig 52 to hold ring 40 in place during attachment, for example by welding.

In addition to ring 40, ridge 30 or a similar structure is preferably added to steering knuckle 21 if such a structure is not already present, again so that a tight connection can be made with first end 24 of boot 20. A further modification that is preferably made is the addition of steering stop 42 to vehicle axle 50 to prevent the steering mechanism from pressing against boot 20 and possibly damaging it. In one embodiment steering stop 42 is welded to ring 40 and/or flange 36. Steering knuckle 21 is generally removed from axle 50 to permit boot 20 to slide over the end of axle 50.

Finally, in one embodiment the entire vehicle axle 50 including boot 20 is pressurized with gas, preferably air, above atmospheric pressure (generally in a range of 1-5 pounds per square inch (psi), 2-3 psi being preferred) to help prevent boot 20 from collapsing when the amphibious vehicle enters the water. About one-third of the inside of the axle contains oil and remaining space is air.

Figure 5:
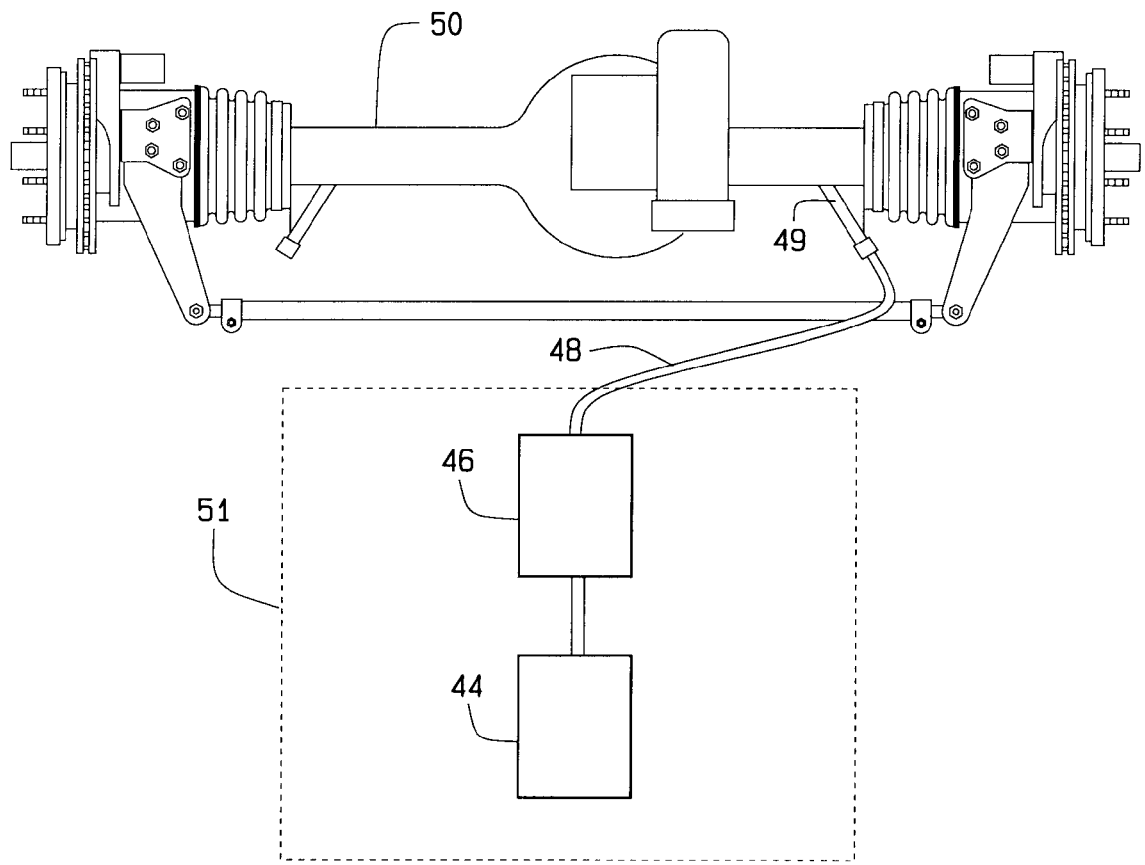
FIG. 5 shows a diagram of the axle air pressurization system of one embodiment of the invention.

Pressurized air is generated by a compressor 44 and stored in a tank 46, compressor 44 and tank 46 being disposed within the hull 51 of the vehicle, and the air is delivered via hoses or lines 48 that are attached to vehicle axle 50 (FIG. 5). To retrofit an axle for air pressurization, a suitable hole is drilled and threaded and an appropriate connector 49 is screwed into the hole, and the hoses or lines 48 are attached to this connector 49. The connector 49 also acts as a vent when the axle 50 is not pressurized. The above-atmospheric pressure inside vehicle axle 50 and boot 20 helps to counter water pressure when vehicle axle 50 is submerged in water. In addition, with the interior of vehicle axle 50 and boot 20 being pressurized this gives additional protection in the case of leaks in the assembly, since air exiting vehicle axle 50 or boot 20 will counter entry of water into steering knuckle 21. In one embodiment boot 20 is pressurized with air only while the vehicle's axle 50 is submerged in water, with the pressure being released upon reaching dry ground, thereby preventing ballooning of boot 20 when water pressure is not present to balance the elevated interior pressure. In yet another embodiment, boot 20 is made of relatively thick material which, while being flexible enough to permit movement of steering knuckle 21, resists ballooning at the relatively low pressures (i.e. 1-5 psi, 2-3 psi preferred) employed.

The need for pressurizing vehicle axle 50 and boot 20 can be particularly important for amphibious vehicles, given the amount of time the vehicles spend exposed to water and the fact that the axles are completely submerged when the vehicle is in water. In contrast, typical "off-road" vehicles encounter water mainly superficially, in the form of spray or splashing from the ground with little or no time spent being submerged, and thus the requirements of a water-protecting boot for land-based off-road vehicles are far less stringent.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A boot for covering a steering knuckle of an amphibious vehicle comprising:
    a flexible tube having a first end and a second end, wherein the first end comprises a molded groove for seating a first clamp,
    wherein the second end comprises a straight cuff for clamping with a second clamp onto a flange attached to an axle connected with and operatively cooperating with said steering knuckle of the amphibious vehicle;
    said second end of said flexible tube having an inside diameter significantly larger than the outside dimensions of said axle at the point of attachment of said flange thereto.

2. The boot of claim 1 wherein the tube comprises a plurality of pleated rings, wherein the rings permit the tube to extend and retract.

3. The boot of claim 2 wherein the flange comprises a ring that is fixedly attached to the housing of the axle of the steering mechanism of the amphibious vehicle, wherein said ring is provided with dimensions approximating the difference between the outside dimensions of said axle and the inside diameter of said second end of said flexible tube.

4. The boot of claim 3 further comprising a steering stop fixedly attached to the flange.

5. The boot of claim 1 wherein the first clamp is a wire clamp.

6. The boot of claim 1 wherein the tube comprises molded neoprene rubber.

7. The boot of claim 1 wherein the molded groove is situated over a ridge of the steering knuckle housing.

8. An axle assembly for an amphibious vehicle comprising:
   an elongated axle having a steering knuckle pivotably attached at an end thereof;
   a flange attached by a ring to the axle near the steering knuckle, said ring imparting a distance between said flange and said axle; and
   a rubber boot having a plurality of circumferential pleats, wherein the boot is attached to the flange and to the knuckle;
   wherein the axle, boot, steering knuckle, flange, and ring form a watertight compartment.

9. The axle assembly of claim 8 wherein the steering knuckle has a circumferential ridge in the housing thereof and a first end of the boot has a complementary groove molded therein, such that a wire clamp tightened over the first end of the boot produces a watertight connection between the boot and the steering knuckle.

10. The axle assembly of claim 9 wherein the boot has a flat cuff molded in a second end of the boot, such that a flat clamp tightened over the cuff produces a watertight connection between the boot and the flange.

11. The axle assembly of claim 10 wherein said axle assembly includes a steering mechanism and further comprising a steering stop mechanism attached to at least one of the flange and the ring, such that the steering stop prevents the steering mechanism from making contact with the boot.

12. The axle assembly of claim 11 further comprising an air hose supplying pressurized air attached to the axle.

13. The axle assembly of claim 12 wherein the source of pressurized air comprises an air compressor and a storage tank for compressed air.

14. The axle assembly of claim 13 wherein the pleats of the boot are rounded.

15. The axle assembly of claim 14 wherein the boot comprises a rubber material that is resistant to ozone and petroleum-based products.

16. The axle assembly of claim 15 wherein the rubber material comprises neoprene rubber.

17. The axle assembly of claim 16 wherein the pressurized air is between approximately one pound per square inch and approximately five pounds per square inch.

18. An axle assembly for an amphibious vehicle comprising:
   an elongated axle having a steering knuckle pivotably attached at an end thereof;
   a steering mechanism operatively connected with said steering knuckle;
   a rubber boot having a plurality of circumferential pleats, wherein the boot is connected at a first end with the steering knuckle and at a second end with the axle at a distance from the steering knuckle; and
   a steering stop mechanism attached to the axle assembly, such that the steering stop prevents the steering mechanism from making contact with the boot.

19. An axle assembly for an amphibious vehicle comprising:
   an elongated axle having a steering knuckle pivotably attached at an end thereof;
   a rubber boot having a plurality of circumferential pleats, wherein the boot is connected at a first end with the steering knuckle and at a second end with the axle at a distance from the steering knuckle; and
   an air hose supplying pressurized air attached to the axle.

20. The axle assembly of claim 19 wherein the source of pressurized air comprises an air compressor and a storage tank for compressed air.

21. The axle assembly of claim 19 wherein the pressurized air is between approximately one pound per square inch and approximately five pounds per square inch.

* * * * *